United States Patent [19]
Wilkerson

[11] 3,762,758
[45] Oct. 2, 1973

[54] MULTI-PURPOSE AUTOMOTIVE AIRFOIL

[76] Inventor: Gary C. Wilkerson, 8486 Montna Dr., Paradise, Calif. 95969

[22] Filed: Feb. 9, 1972

[21] Appl. No.: 224,871

[52] U.S. Cl. ........ 296/1 S, 224/42.03 A, 224/42.42
[51] Int. Cl. ............................................ B62d 35/00
[58] Field of Search .................... 296/1 S, 28 K, 91; 224/42.42, 42.03 R, 42.03 A, 42.04, 42.07

[56] References Cited
UNITED STATES PATENTS

| 3,561,813 | 2/1971 | Barenyi et al. | 296/28 K |
|---|---|---|---|
| 1,575,074 | 3/1926 | Nordgren | 224/42.07 |
| 2,701,728 | 2/1955 | Miller | 224/42.04 |
| 3,228,576 | 1/1966 | Gaukel | 224/42.03 A |
| 3,415,566 | 12/1968 | Kerrigan | 296/91 X |
| 3,425,740 | 2/1969 | DeVaughn | 296/1 S |
| 3,471,070 | 10/1969 | Olson | 224/42.04 |

Primary Examiner—Leo Friaglia
Assistant Examiner—John A. Pekar
Attorney—Roland I. Griffin

[57] ABSTRACT

A hollow airfoil for the front end of a blunt-nosed van is provided with a rounded front, a sloping top, and a contoured bumper and mounting assembly secured to the base of the airfoil and to the frame of the van. The sloping top of the airfoil is provided with a door so that the interior of the airfoil may also be used for storage and ballast.

2 Claims, 5 Drawing Figures

PATENTED OCT 2 1973 3,762,758

MULTI-PURPOSE AUTOMOTIVE AIRFOIL

BACKGROUND OF THE INVENTION

This invention relates generally to airfoils for blunt-nosed vans and, more particularly, to an airfoil that may be secured to the front end of such a van to improve its stability, handling, and safety while at the same time providing additional storage space and a stronger, safer bumper.

Blunt-nosed vans, such as the Volkswagen Transporter, typically have a high forward wind resistance. Moreover, they also typically have a very uneven weight distribution since their engines and storage areas are generally located at or towards the back end thereof. These factors degrade the stability and handling and, consequently, the safety of such vans, especially at higher driving speeds.

The bumpers employed in blunt-nosed vans are typically frail and are secured to the front end thereof in very close proximity to the steering mechanism and the driver. This provides very limited protection in the event of any type of front end collision and therefore further degrades the safety of such vans.

SUMMARY OF THE INVENTION

The principal object of this invention is to provide an airfoil for decreasing the forward wind resistance and improving the weight distribution of blunt-nosed vans, such as the Volkswagen Transporter, and thereby improving their stability, handling, and safety while at the same time providing them with additional storage space.

Another object of this invention is to provide an airfoil for further improving the safety of blunt-nosed vans, such as the Volkswagen Transporter, by providing them with a stronger and safer bumper.

These objects are accomplished according to the illustrated preferred embodiment of this invention by providing a hollow airfoil with a pair of parallel sides, a rounded front, a contoured back, a flat bottom, a flat top sloping downwardly from the back to the front of the airfoil, a pair of mounting bars secured to the sides of the airfoil at the base thereof, and a contoured bumper secured to the mounting bars and to the front of the airfoil at the base thereof. The airfoil is mounted on the front of a blunt-nosed van, such as the Volkswagen Transporter, between the headlights and between the windshield and bottom of the van by securing the mounting bars to the frame of the van. A hinged door is provided in the top of the airfoil so that the interior of the airfoil may also be used for storage and ballast.

DESCRIPTION OF THE DRAWING

FIGS. 4 and 5 show how the airfoil is mounted on the van.

DESCRIPTION OF THE PREFERRED EMBODIMENT

Figure 1:
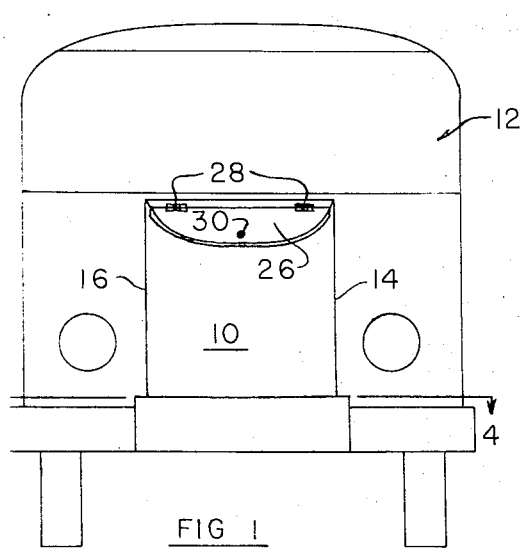
FIG. 1 is a front elevational view of a blunt-nosed van with an airfoil according to the preferred embodiment of this invention.
Figure 2:
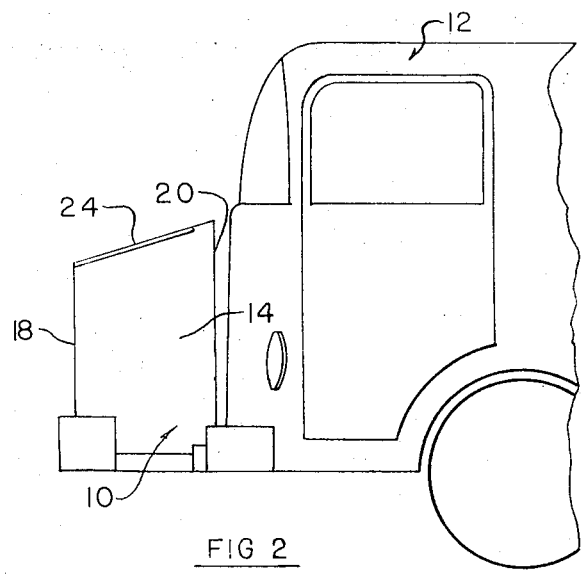
FIG. 2 is a side elevational view of an airfoil and front end of the van of FIG. 1.
Figure 4:
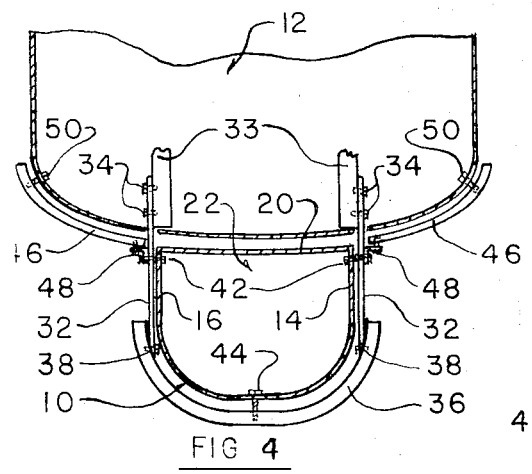
FIG. 4 is a horizontal sectional view of the airfoil and front end of the van of FIGS. 1 - 3 taken along the line 4 — 4 of FIG. 1.
Figure 3:
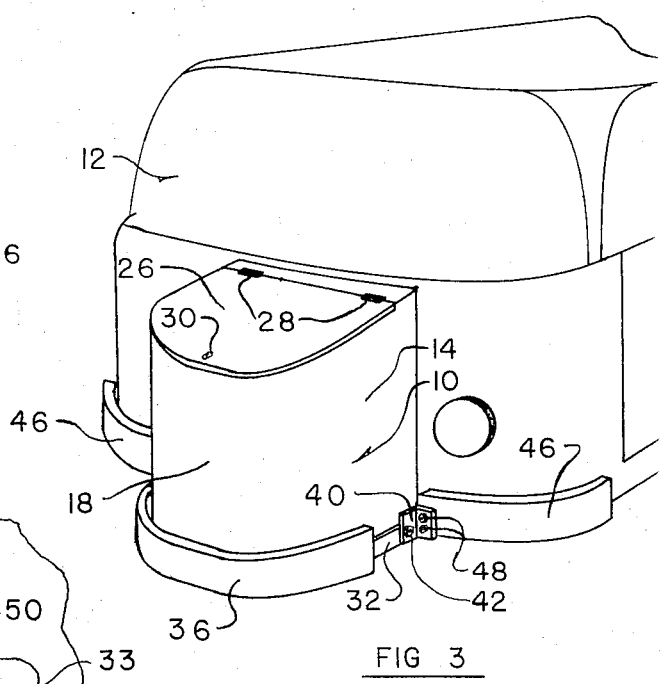
FIG. 3 is a perspective view of the airfoil and front end of the van of FIGS. 1 and 2.

Referring now to FIGS. 1 - 4, there is shown a hollow airfoil 10 constructed according to the preferred embodiment of this invention and mounted on the front end of a blunt-nosed van 12, such as the Volkswagen Transporter. Airfoil 10 has a pair of parallel vertical sides 14 and 16, a rounded vertical front 18, a contoured vertical back 20 generally conforming to the contoured front end of van 12, a flat horizontal bottom 22, and a flat top 24 sloping downwardly from the contoured back 20 to the rounded front 18 at an angle of about 15°. The top 24 of airfoil 10 is provided with a door 26 attached to the airfoil by a pair of hinges 28 so that the door may be raised and leaned against the front end of van 12 to permit ready access to the interior of the airfoil. Tools, other items, and/or ballast may thereupon be stored within the airfoil to improve the weight distribution of van 12 and thereby improve its stability, handling, and safety. Door 26 may then be closed and secured in place by a latch 30 of the type that may also be locked. Airfoil 10 may be constructed of fiberglass, sheet metal, or other such materials. For a van, such as the Volkswagen Transporter, airfoil 10 should be about 36 inches in height at the back 20, 29 inches in width between the sides 14 and 16, and 22 inches in depth from the front 18 to the back 20.

Figure 5:
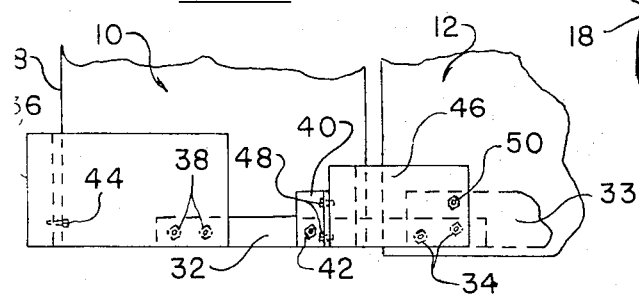
FIG. 5 is a fragmentary side elevational view of the airfoil and front end of the van of FIGS. 1 - 3.

Airfoil 10 is mounted on the front end of van 12 between the headlights and between the windshield and the bottom of the van. This is accomplished by removing the standard bumper of the van, by bolting a pair of frame extending mounting bars 32 to the frame 33 of the van as indicated at 34 in FIGS. 4 and 5, by bolting a contoured bumper 36 generally conforming to the rounded front 18 of airfoil 10 to mounting bars 32 as indicated at 38 in FIGS. 4 and 5, by bolting the sides of airfoil 10 at the base thereof and a pair of angle irons 40 to mounting bars 32 as indicated at 42 in FIGS. 3 - 5, and by additionally bolting the front of airfoil 10 at the base thereof to contoured bumper 36 as indicated at 44 in FIGS. 4 and 5. Two additional contoured bumpers 46 are mounted on the front end of van 12 on opposite sides of airfoil 10 by bolting them to angle irons 40 as indicated at 48 in FIGS. 3 - 5 and by additionally bolting them to the body of the van as indicated at 50 in FIGS. 4 and 5. Mounting bars 32 and contoured bumpers 36 and 46 are all constructed of steel or some other such strong material. For a van, such as the Volkswagen Transporter, mounting bars 32 should be about 20 inches in length, 2 inches in width, and one-quarter of an inch in thickness. Contoured bumper 36 should be about 8 inches in height, and contoured bumpers 46 should each be about 6 inches in height.

Airfoil 10 substantially reduces the forward wind resistance of van 12 and thereby further improves its stability, handling, and safety. Moreover, contoured bumper 36 is stronger and spaced further from the body of van 12 than the standard bumper it replaces. This still further improves the safety of van 12.

I claim:

1. An automotive airfoil for use on the front end of a blunt-nosed van, said airfoil comprising:

a housing with a front portion decreasing in width toward the front end of the housing, with a top portion sloping downwardly and decreasing in height toward the front end of the housing, and with a door permitting access to the interior of the housing;

said housing being proportioned to be mounted adjacent to the front end of the blunt-nosed van below the front windshield and between the headlights of the blunt-nosed van;

a bumper for the housing; and mounting means for securing the housing and the bumper to the frame of the blunt-nosed van to mount the housing adjacent to the front end of the blunt-nosed van below the front windshield and between the headlights of the blunt-nosed van and to mount the bumper adjacent to the front end of the housing along a lower portion thereof.

2. An automotive airfoil as in claim 1 wherein:

said front portion of the housing is rounded; and said mounting means comprises a pair of mounting bars for being secured to the bumper, the housing, and the frame of the blunt-nosed van.

* * * * *